M. F. O'CONNOR.
BELT JACK.
APPLICATION FILED MAR. 13, 1916.
1,191,722.
Patented July 18, 1916.
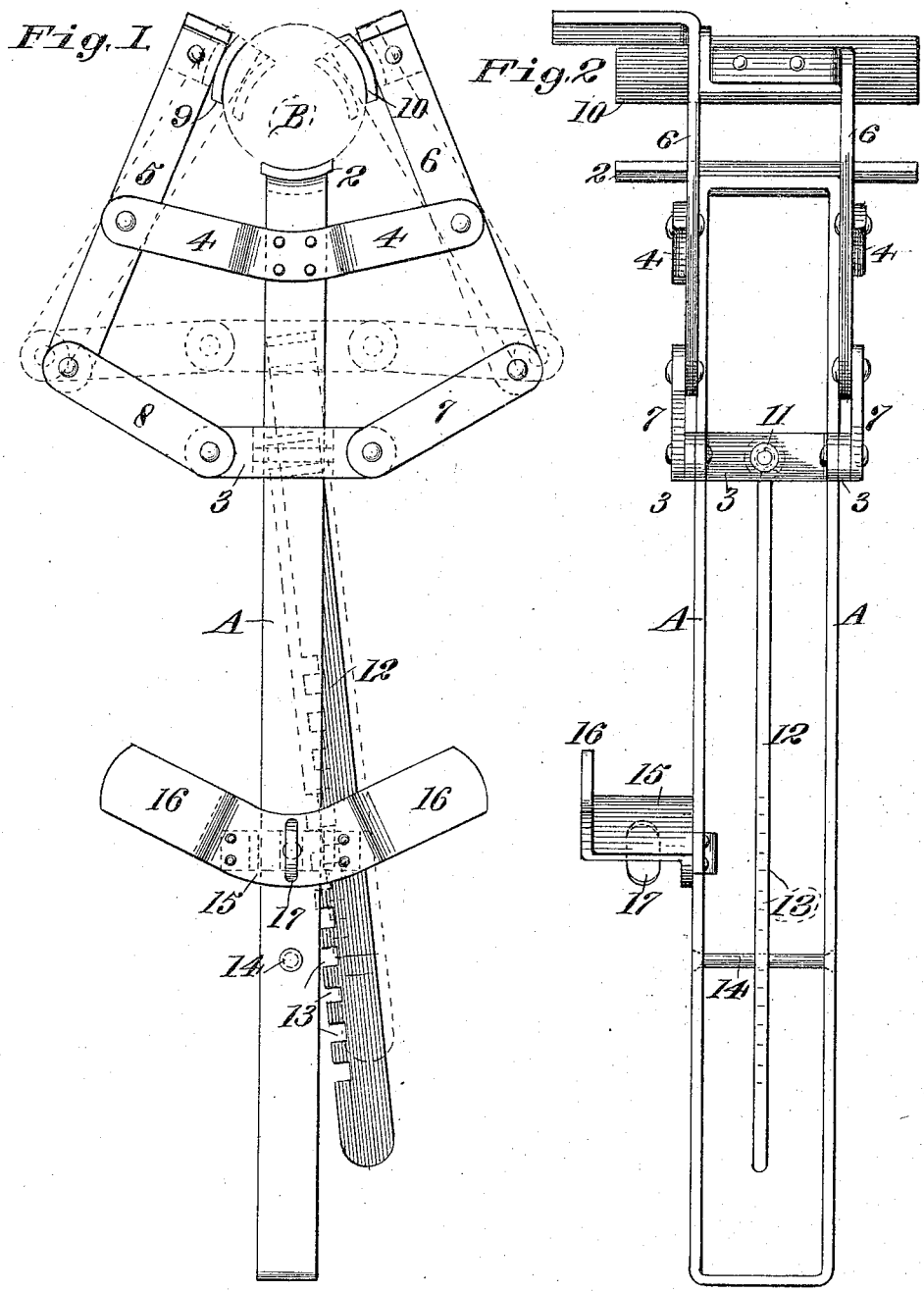

UNITED STATES PATENT OFFICE.

MICHAEL F. O'CONNOR, OF SAN FRANCISCO, CALIFORNIA, ASSIGNOR OF ONE-HALF TO MILTON H. COOK, OF SAN FRANCISCO, CALIFORNIA.

BELT-JACK.

1,191,722.

Specification of Letters Patent.

Patented July 18, 1916.

Application filed March 13, 1916. Serial No. 83,812.

*To all whom it may concern:*

Be it known that I, MICHAEL F. O'CONNOR, a citizen of the United States, residing at the city and county of San Francisco and State of California, have invented new and useful Improvements in Belt-Jacks, of which the following is a specification.

This invention relates to a belt jack.

The object of the present invention is to provide a simple, substantial belt jack by which a belt can be placed upon a pulley, easily and quickly and which is adjustable to accommodate pulleys of varying dimensions.

Further objects will hereinafter appear.

The invention consists of the parts and the construction and combination of parts as hereinafter more fully described and claimed, having reference to the accompanying drawings, in which—

Figure 1 is a side elevation of the belt jack. Fig. 2 is an edge view of same.

Referring to the drawings in detail, A indicates a U-shaped lever constructed of strap iron and having secured on its inner end a segmental-shaped stationary shoe 2. Slidably mounted on the lever is a cross-head 3 and pivotally mounted upon a pair of bracket arms 4, secured on the lever is a pair of crank arms 5 and 6, which are connected to the cross-head 3 by means of links 7 and 8. Secured on the outer ends of the crank arms 5 and 6 are a pair of movable segmental-shaped shoes 9 and 10 which are adapted to coöperate with the stationary shoe 2, as will hereinafter be described.

Pivotally mounted as at 11 in the cross-head 3 in a position interior of the main lever A is a rod 12, the end of which is notched as at 13 to permit the rod to be interlocked with a pin 14, secured in the lever. Slidably mounted on one side of the lever A is a holder 15 provided with a pair of extension arms 16 and a clamping screw 17 provided for the purpose of locking the holder upon the lever A when in an adjusted position. When placing a belt upon a pulley, it is accomplished by first placing the stationary shoe 2 against the shaft upon which the pulley is mounted on one side thereof. The rod 12 is then pulled in one direction or the other to move the cross-head 3 for the purpose of rocking the crank arms 5 and 6 into a position where the shoes 9 and 10 will engage the shaft, as shown in Fig. 1. The rod 12 is then moved into locking engagement with the pin 14, thus securing the jack against removal, but still permitting it to be turned about the shaft. The holder 15 is now adjusted to assume a position practically opposite the cone surface of the pulley and the belt is next placed in position upon the holder. The jack as a whole is then turned about the shaft, indicated at B until the belt is lifted into alinement with the pulley, thus causing the edge of the belt to slip over the outer edge of the pulley and a slight side pressure of the lever A will then force the belt into position. The adjustable mounting of the shoes 9 and 10 permits the jack to be secured to practically any size shaft desired, and the adjustable mounting of the holder 15 permits application of belts of different size pulleys.

The device as a whole is thus useful in connection with either small or large pulleys and entirely eliminates the dangers usually encountered when belts are placed upon the pulleys by hand.

The materials and finish of the several parts of the device may otherwise be such as the judgment and experience of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. A belt jack comprising a lever having a stationary shoe secured on one end which is adapted to engage a shaft, a pair of adjustable shoes carried by the lever adjacent the stationary shoe also engageable with the shaft, means for locking said shoes against movement, and a belt holder carried by the lever.

2. A belt jack comprising a lever having a stationary shoe secured on one end which is adapted to engage a shaft, a pair of adjustable shoes carried by the lever adjacent the stationary shoe also engageable with the shaft, means for locking said shoes against movement, a belt holder adjustably mounted on the lever, and means for locking said holder in any adjusted position.

3. A belt jack comprising a lever having a stationary shoe secured on one end, a pair of bracket arms on the lever, a pair of crank arms pivotally mounted in said bracket arms, a shoe carried by each crank arm, a cross-head slidably mounted on the lever, a link connecting each crank arm with the cross-head, means for moving the cross-head to rock the crank arms and attached shoes, means for locking the cross-head against movement, and a belt holder carried by the lever.

4. A belt jack comprising a lever having a stationary shoe secured on one end, a pair of bracket arms on the lever, a pair of crank arms pivotally mounted in said bracket arms, a shoe carried by each crank arm, a cross-head slidably mounted on the lever, a link connecting each crank arm with the cross-head, a rod pivotally connected with the cross-head, means for locking said rod and cross-head against movement, and a belt holder carried by the lever.

5. A belt jack comprising a lever having a stationary shoe secured on one end, a pair of bracket arms on the lever, a pair of crank arms pivotally mounted in said bracket arms, a shoe carried by each crank arm, a cross-head slidably mounted on the lever, a link connecting each crank arm with the cross-head, a rod pivotally connected with the cross-head, means for locking said rod and cross-head against movement, a belt holder adjustably mounted on the lever, and means for locking said holder in any adjusted position.

In testimony whereof I have hereunto set my hand in the presence of two subscribing witnesses.

MICHAEL F. O'CONNOR.

Witnesses:
G. H. STRONG,
JOHN H. HERRING.

Copies of this patent may be obtained for five cents each, by addressing the "Commissioner of Patents, Washington, D. C."